United States Patent [19]

Katt et al.

[11] Patent Number: 4,623,549

[45] Date of Patent: Nov. 18, 1986

[54] DRY INSTANT FOOD COMPOSITION

[75] Inventors: Judy L. Katt, Decatur; Carl O. Moore, Rochester; James E. Eastman, Decatur, all of Ill.

[73] Assignee: A. E. Staley Manufacturing Company, Decatur, Ill.

[21] Appl. No.: 832,094

[22] Filed: Feb. 20, 1986

[51] Int. Cl.$^4$ .......................... A23L 1/187; A23L 1/22
[52] U.S. Cl. .................................. 426/548; 426/579; 426/804; 426/661; 426/578
[58] Field of Search ............... 426/579, 578, 548, 804, 426/661

[56] References Cited

U.S. PATENT DOCUMENTS

| | | |
|---|---|---|
| 3,914,456 | 10/1976 | Norsby et al. . |
| 4,006,262 | 2/1977 | Smith et al. . |
| 4,229,489 | 10/1980 | Chiu et al. . |
| 4,262,031 | 4/1981 | Carpenter et al. . |
| 4,438,148 | 3/1984 | O'Rourke et al. . |
| 4,452,978 | 6/1984 | Eastman . |
| 4,469,712 | 9/1984 | Katcher et al. . |
| 4,504,512 | 3/1985 | Danielson et al. . |
| 4,518,622 | 5/1985 | Wilson et al. ....................... 426/579 |

OTHER PUBLICATIONS

Article entitled "Easy Dispersing Instant Starch Designed for Puddings, Reduced-Calorie Dry Food Mixes"—Cal Andres: *Food Processing*, Nov. 1985.

*Primary Examiner*—Jeanette Hunter
*Attorney, Agent, or Firm*—Michael F. Campbell; James B. Guffey; Philip L. Bateman

[57] ABSTRACT

A dry instant dessert mix composition containing a cold water swelling hydroxypropylated granular starch component, a non-starch saccharide bulking and/or sweetener agent and a high intensity sweetener, which can be readily dispersed and hydrated in cold liquids. The dry mix composition is particularly advantageous in that it can be formulated to provide a reduced calorie dessert mix composition.

6 Claims, No Drawings

DRY INSTANT FOOD COMPOSITION

FIELD OF THE INVENTION

The present invention relates to a substantially dry instant food mix composition, in particular, dessert products, with improved dispersion properties, that readily disperse and hydrate in aqueous liquid to produce a smooth and creamy textured food product.

BACKGROUND OF THE INVENTION

Dry instant food mix compositions have been used by consumers for many years. Such foods include sauces, gravies, dips, and desserts. An object of providing such convenience foods is to provide the consumer with a product that reduces the time and ingredients used in preparation of a ready to eat food. Such foods generally require ingredients that thicken, gel or otherwise increase the viscosity of the prepared food.

It is desirable to use starch as the viscosity control agent in such foods because of economics and availability of starch products. A limiting factor in formulating dry instant food mix compositions is the poor dispersion characteristics of instant starch products. Stabilizers and thickeners such as starches that are commonly used in dry mix instant food mixes such as desserts are usually extremely hydrophilic. That is, they tend to very quickly absorb water. Generally, the stabilizers and thickeners are diluted with dry bulking materials such as sugar to allow proper dispersion of the dry mix into liquids. In most cases, if sugar is removed from the composition for caloric reduction purposes, most powdered, instantized stabilizers will fail to disperse completely, leaving objectionable entrapped dry particles or "fish eyes" in the finished dessert product.

U.S. Pat. No. 4,504,512 issued Mar. 12, 1985 to Danielson, et al. points out the problem of dispersibility of dry pudding mixes. In the claimed dry pudding mix composition a bulking agent such as sugar is required to aid in dispersing the ingredients and promoting rapid mixing free of lumps. When artificial sweeteners are used in this composition, suitable non-sweet bulking agents are required.

Consumer interest in low calorie convenience foods has encouraged development of reduced calorie versions of traditional food products. Desserts and puddings are no exception for such efforts.

Puddings and dessert products are starch based products that gel or set to a thickened mass. Examples of such desserts are lemon, lemon meringue, coconut cream, chocolate, vanilla, banana cream puddings or pie filling and the like. These desserts are characterized by having a pleasant smooth eating texture while also possessing sufficient strength and rigidity.

In typical recipe preparations of traditional dessert products prepared by cooking (boiling) a mixture of sugar, starch and water or milk (together with flavorants and/or colorants and other additives peculiar to the particular dessert in question as, for example, the use of egg in lemon puddings to contribute to the unique texture thereof), during which process the starch granules undergo progressively increasing stages of water absorption, swelling and loss of birefringence, along with leaching out of soluble portions of the starch. The aqueous mixture increases greatly in viscosity and, upon cooling sets to a firm gel structure.

The convenience form of a dessert product of the starch-based filling type is predicted upon the provision of a dry filling mix containing the full complement of sugars, starch, flavorings, etc. which can be admixed with water or other aqueous medium and cooked to provide a filling which can be poured into a serving dish or a pie shell and which will set upon cooling.

It has been perceived as desirable to provide the consumer with a mix, preferably reduced in calories, which can be reconstituted to form a thickened or gelled starch-based filling without any need for cooking, i.e., using ordinary tap water, cold water, cold milk or the like.

The carbohydrate or sweetener components of dry mixes are logical targets for calorie reduction. In general this means decreasing the amount of sugar or other traditional sweetener in a given weight of dessert mix. Ideally, high intensity sweeteners such as aspartame, saccharin and the like would be used to completely or partially replace sugar in instant dessert compositions. The reduction of carbohydrates by replacing sugar with high intensity sweeteners causes problems in formulating products that have the desired texture.

U.S. Pat. No. 4,262,031 issued Apr. 14, 1981 to Carpenter et al discloses a process for preparing a cooked pudding composition containing a highly-dutched cocoa. This patent discloses a dry pudding mix containing 25-98% starch and a variable amount of sweetener. However, this is a cook up pudding rather than instant pudding. U.S. Pat. No. 3,914,456 issued Oct. 21, 1978 to Norsby et al discloses a dry mix pudding composition comprising about 70-88% sucrose by weight of the dry mix composition, about 3 to 9% pregelatinized waxy maize corn starch and about 11 to 19% pregelatinized tapioca starch by weight of the dry mix.

It is an object of this invention to provide a substantially dry instant food or dessert mix composition that is predominantly starch and can be readily dispersed in cold liquids.

It is a further object of this invention to provide a method of making a ready to eat food from a dry instant food mix composition.

It is a further object of this invention to provide an instant dry mix pudding composition comprised predominantly of starch in combination with a high intensity sweetener.

Further it is an object of this invention to provide a dry instant dessert mix composition which has at least one-third fewer calories per standard serving than traditional dry instant dessert mixes.

Other objects and advantages of this invention will become apparent by reference to the following specification.

Throughout the specification and claims all ratios and percentages are stated on a weight basis and temperatures are in degrees Celsius unless otherwise indicated.

SUMMARY OF THE INVENTION

This invention is a dry instant dessert mix composition which is capable of dispersing in a cold aqueous medium and hydrating without lumping to produce a smooth textured dessert and which comprises:

(a) from about 50 to 95 percent of a cold water swelling hydroxypropylated granular starch component characterized by (1) a hydroxypropyl substitution level of from about 6 to 15 percent and (2) a viscosity profile, as measured by the Hydration Rate test using 5.5 percent starch (dsb) in 10° C. water, of less than 1,500 centipoises initially and more than 5,000 centipoises after 5 minutes hydration;

(b) from about 0 to about 40 percent of a non-starch saccharide bulking and/or sweetener agent component selected from the group of mono-, di-, oligo- and polysaccharides; and, (c) a high intensity sweetener in an amount sufficient to increase the sweetness of said dessert composition.

As used herein, initially, as referred to in (a) (2) above, is defined as being within 15 seconds of completion of adding starch to 10° C. water and stirring for 30 seconds.

The cold water swelling hydroxypropylated granular starch used in the dry instant dessert mix composition has surprisingly good dispersion properties. These properties allow the reduction in the amount of bulking agent or carrier used as compared to the amount used in traditional instant foods. Reduction of the amount of carbohydrate bulking agent used allows the formulation of a reduced calorie dessert mix.

DETAILED DESCRIPTION OF THE INVENTION

In the present invention, a dry mix for preparing desserts or puddings is provided by admixing a cold water swelling hydroxypropylated granular starch component, an optional non-starch saccharide sweetener and/or bulking component, a high intensity sweetener component and other appropriate flavorants, colorants, acidulants or the like. The mix is adapted to be hydrated in an aqueous medium, preferably milk or water, at a temperature of less than about 20° C., preferably less than about 10° C., most preferably less than about 5° C., to directly form a viscous mass which, without need for heating or cooking, will set up to a smooth, lump free, firm structure suitable for use as a dessert or pudding.

The ratio of the starch component to non-starch saccharide bulking and/or sweetener agent component in this composition can be controlled to reduce the calorie content in the final ready to eat desset so that it contains at least one third fewer calories per standard serving than that of comparable dessert compositions.

The starch component is a critical component of this invention. The starch component for this invention must have delayed hydration properties so that it can be dispersed into liquid with a substantially reduced amount of non-starch saccharide bulking and/or sweetening agent. Currently available starches that are traditionally used in dry dessert mixes will hydrate rapidly and form lumps or "fish eyes" when used with reduced levels of saccharide bulking agent material. Such lumps will not hydrate completely leaving a lumpy, low viscosity dessert.

It has been discovered that a cold water swelling hydroxypropyl starch prepared under specific process conditions and with specific levels of hydroxypropyl substitution will exhibit "delayed" hydration properties. The delayed hydrating property is exhibited for just a few minutes to allow dispersion of the mix composition without lumping. Once the dessert mix composition is dispersed, the starch described in this invention will rapidly hydrate and thicken to the desired viscosity.

The starch components which are suitable for use in this invention are characterized as cold water swelling hydroxypropyl granular starches with a specific hydration and viscosity profile. The starch may be derived from a wide variety of plant sources including tapioca, rice, wheat, corn, waxy maize, waxy sorghum, and similar starch sources. The starch is hydroxypropylated, with crosslinking optional, in a lower alcohol slurry in a manner in accordance with the procedure described in U.S. Pat. No. 4,452,978 issued to Eastman on June 6, 1984 which is incorporated by reference.

It has been discovered that hydroxypropylated starches prepared within a specific range of hydroxypropyl substitution provide a delayed hydrating starch component for the present invention that without cooking does not lump or form "fish eyes" and yields the dsired final product texture. Additionally, the hydrated dessert does not exhibit syneresis upon setting.

The starches of the present invention are prepared by reacting ungelatinized granular starch with propylene oxide in a liquid medium comprising a $C_1$-$C_3$ alkanol and water under alkaline conditions at reaction temperatures in excess of about 100° C. and with reaction times ranging from less than 1 minute to about 3 hours.

The term "ungelatinized granular starch" refers to starch which has not been subjected to granule fragmenting process conditions and which therefor consists essentially of whole unfragmented granules. The starch starting materials for the present process can be unmodified or chemically modified in a manner which does not destroy the granular structure of the starch. Thus the ungelatinized granular starch starting materials for the present process include unmodified starches, bleached starches, starches which have been cross-linked with multifunctional starch cross-linking agents such as phosphorous oxychloride, sodium trimetaphosphate, acrolein or epichlorohydrin, or starches which have been substituted to varying degrees with, for example, known or art-recognized esterifying agents. Preferred starch starting materials for the present cold water swelling starch material include unmodified starches selected from corn and waxy maize, and those same starches which have been cross-linked using multifunctional esterifying or etherifying agents. An ungelatinized corn starch is the most preferred starting starch material for the present invention. Cross-linking can be accomplished before or after starch hydroxypropylation by the present process.

The process for preparing the above-described cold water swelling hydroxypropylated granular starches can be carried out at a batch-type process or as a continuous process. In either instance the first step for preparing the such cold water swelling hydroxylated granular starches is the preparation of a reaction slurry containing the ungelatinized starch starting material, an alkaline agent, and propylene oxide in a liquid medium comprising a $C_1$-$C_3$ alkanol and a limited amount of water (i.e., less than 10% water by weight of the liquid medium including the water in the starch). The reaction slurry is heated to a temperature of above about 100° C., and preferably to a temperature of about 145° C. to about 175° C. under autogenic pressure for a period of time ranging from about 1 minute to about 3 hours. The heating process can be conducted in a sealed vessel (batch process) or by passing the reaction slurry through a heated confined zone at a rate calculated to give the required residence time for the slurry in the heated zone (continuous or semicontinuous process). Applicants have found that when the process is conducted within the most preferred temperature range of about 145° C. to about 175° C. the hydroxypropylation reaction is usually complete in less than 30 minutes.

The reaction slurry is preferably prepared by (1) suspending 1 part by weight of the ungelatinized starch starting material in about 1 to about 3 parts by weight of $C_1$-$C_3$ alcohol; (2) optionally sparging the alcoholic starch slurry with nitrogen to remove (or minimize the amount of) dissolved oxygen in the slurry; (3) adding an alkali metal hydroxide (preferably sodium hydroxide or potassium hydroxide or an equivalent thereof) either as pellets or flakes or in concentrated aqueous or alcoholic solution; and (4) adding propylene oxide in an amount sufficient to give the desired hydroxypropyl substitution levels in the starch product. The nitrogen sparging step helps to minimize discoloration of the starch during processing.

The alcohol which serves as the major component of the reaction slurry can be methanol, ethanol, propanol, or isopropanol. Ethanol is preferred. Some proportion of water is also desirable in the reaction slurry. The amount of water in the slurry, however, must be below that which would cause gelatinization of the hydroxypropylated product starch under the reaction conditions of the process. The maximum amount of water which should be added to the reaction mixture depends primarily on the substitution level of the hydroxypropylated starch product, the temperature at which hydroxypropylation reaction is conducted, the moisture level of the ungelatinized starch starting material, the form in which the alkaline catalyst is added (that is pellets or flakes opposed to concentrated aqueous solution) and to some extent the alcohol used as the processing medium. Since it is desired that the hydroxypropylated starch product will have a level of substitution such that the product will have a pasting temperature below about 20° C., the liquid medium portion of the reaction slurry should contain less than about 10% by weight water including the water in the starch. Where the granular starch starting material has a water content between about 8 and about 12% by weight, and where the alkaline reagent is added as an aqueous solution additional water need not be added to the reaction slurry. The indicated process in generally most efficient at the preferred reaction temperatures where the total water content, including the water in the ungelatinized starch starting material, is within a range of about 2 to about 5% by weight of the liquid medium.

The reaction slurry is rendered alkaline by the addition of an alkaline reagent which is substantially soluble in the liquid phase of the reaction slurry. Preferred alkaline reagents are alkali metal hydroxides, especially sodium hydroxide or potassium hydroxide or equivalents thereof. As mentioned above the alkaline reagent can be added as a solid, such as pellets or flakes, or in concentrated aqueous or alcoholic solution. Typically from about 1 to about 3% by weight of the starch (dsb) of the alkaline reagent is added to the reaction slurry. When sodium or potassium hydroxide is used as the alkaline reagent, the indicated hydroxypropylation reaction is typically most efficient when the alkali metal hydroxide is added in an amount equal to about 1.5 to about 2.5% of the weight of starch, dsb. In an especially preferred embodiment, an alkali metal hydroxide is utilized in the hydroxypropylation reaction slurry at a rate of about 1.8% of weight of the starch, dsb.

The hydroxypropylating agent in propylene oxide. It has been discovered that the required level of hydroxypropyl substitution is from about 6 to about 15 percent, preferably from about 7 to about 14 percent and most preferably from 7 to about 12 percent. The hydroxypropyl content of the starches is determined by the NMR method described in "A Rapid Nuclear Magnetic Resource Method for Determining Hydroxypropyl Groups in Modified Starch" by H. Stahl and R. P. McNaught (Cereal Chem 47:345-350, 1970) and modified by using sodium 2,2-dimethyl-2-silapentane sulfonate as an internal standard. All results were reported on an ash-free, propylene glycol free and moisture-free basis.

The aforementioned hydroxypropylation present process is typically conducted at reaction temperatures ranging from about 100° to about 180° C. and preferably at temperatures between about 145° and 175° C. Because the reaction temperatures are typically in excess of the boiling point of the liquid medium, the process must be conducted in a closed vessel or otherwise under pressure sufficient to keep the medium in the liquid state at the reaction temperatures.

The time required to complete the hydroxypropylation reaction process depends of course on other process parameters such as the reaction temperature, starch concentration, time, the amount of propylene oxide in the reaction mixture, and the desired level of hydroxypropylation of the cold water swelling hydroxypropylated granular starch product. The reaction time can range anywhere from less than 1 minute up to about 3 hours. Over the preferred temperature range of about 145° to about 175° C. the reaction time will generally range from under 5 minutes to about 30 minutes.

While the starch products can be left in the alkaline state it is preferred that they be neutralized with acid. After the heating step the starch slurry is usually cooled to below about 65° C. and then treated with a neutralizing amount of an acid, for example, glacial acetic acid. Enough acid should be added to the reaction mixture so that a 50 ml aliquot of the slurry in a 150 ml of distilled water at room temperature will have a pH of about 4.5-5. Because diffusion of alkali from the processed starch granules into the alcohol medium is slow, the reaction slurry is typically stirred following addition of the acid for a period of about 15 minutes to about 60 minutes. The time required to complete the starch neutralization process can be minimized by warming the neutralized reaction medium.

The cold water swelling hydroxypropylated granular starch product is separated from the liquid medium component of the reaction slurry by filtration or centrifugation, washed with one or more volumes of the alcohol used in the process (or a mixture of that alcohol and water) and then dried or desolventized by conventional methods. For example, the starch can be dried in an oven to a certain volatiles level and then contacted with a hot humid gas, preferably moist air, while the starch is maintained at a temperature from about 60° to about 121° C.

The cold water swelling hydroxypropylated granular starch products prepared in the fashion described above have, by reason of their method of preparation a reduced fat content. Unprocessed granular starches typically have a native fat content ranging from about 0.4 to about 0.6% by weight. In contrast, the hydroxypropylated starches employed in the present invention generally have a fat content below about 0.25% and often below about 0.15%.

The starch product prepared as described above has unique delayed hydrating properties that allow the starch to be easily dispersed in the absence of substantial amounts of bulking agents in cold liquids to yield a smooth, consistent starch paste.

The delayed hydrating properties and viscosity profiles of the starch of this invention were characterized by the following "Hydration Rate Test".

APPARATUS

1. Water bath at 10° C.
2. 600 ml stainless steel beaker.
3. Servodyne Motor with Speed Controller (Model 4420) available from Cole-Palmer Instrument Company, Chicago, Il.
4. Stirrer—Lightnin Mixer, stainless steel, 45.7 cm shaft cut to 16.5 cm, .79 cm diameter, Scientific Products catalog No. 58117-2.
5. Balance—readable to 0.01 g.
6. Brookfield Viscometer with spindles 1 through 7.

PROCEDURE

1. Secure the 600 ml stainless steel beaker in the 10° C. water bath.
2. Add 400 ml deionized water and place stirrer in the beaker so that the blade is 1.9 cm from the bottom and the shaft is 1.27 cm off-center.
3. Stir at 500 rpm until the water temperature is equal to the bath temperature.
4. Weight 22 g, d.s.b., starch onto weighing paper (weigh to 0.01±0.01 g).
5. Transfer the starch to the beaker (while stirring), uniformly, over five seconds.
6. Stir exactly 30 seconds and quickly remove the beaker from the bath.
7. Quickly read (within 15 seconds) the Brookfield viscosity with the appropriate spindle at 20 rpm. This is the inital reading or viscosity measurement.
8. Place the beaker in the bath, without stirring. Remove (and replace) beaker after 5, 10 and 30 minutes from the start of the test, and obtain Brookfield viscosity readings of the starch paste.

The starch component of this invention possesses the following viscosity characteristics:

When added at a 5.5 percent level (dsb) to water at 10° C., the starch can easily be dispersed by stirring and has an initial Brookfield viscosity (measurement taken within 15 seconds after stirring starch into 10° C. water) of less than 1,500 centipoise (cps), preferably less than 1,000 cps and most preferably less than 500 cps and a 5 minute Brookfield viscosity of more than 5,000 cps, preferably more than 7,000 cps and most preferably more than 10,000 cps.

The cold water swelling hydroxypropylated granular starch is advantageously used in accordance with the present invention in a dry instant dessert mix composition that is capable of dispersing in a cold aqueous medium and hydrating without lumping to produce a smooth textured dessert. The ease of dispersion and lack of lump formation by the cold water swelling starch in the absence of substantial amounts of non-starch saccharide bulking and/or sweetener agents allows the preparation of reduced calorie instant food products. The amount of bulking agent in the dessert composition can be reduced substantially or eliminated in some instances. The net result is a dry instant dessert composition that is composed predominantly of starch; with a minimal amount of non-starch saccharide bulking and/or sweetener agent; sweetener, preferably a high intensity type of sweetener and traditional setting salts, colors, flavors, acidulants and other ingredients normally used in dry instant dessert composition mixes.

The amount of starch component in the dry mix will be from about 50 percent to about 95 percent by weight of the overall dry mix, and preferably from about 60 percent to about 85 percent by weight. In terms of the prepared hydrated mix (including aqueous ingredients), the starch component will be present in an amount from about 2.5 percent to about 6 percent by weight of the hydrated mix.

The non-starch saccharide bulking and/or sweetener component of the dry mix of this invention can be any mono-, di-, oligo- or polysaccharide, or mixtures thereof, capable of providing the desired body to the filling and capable of being used in a form compatible with the substantially dry, free-flowing, particulate nature of the mix. Among the suitable sweetener components are sucrose, dextrose, fructose, sorbitol, highly converted dry corn syrup solids, high fructose corn syrup solids and other sugars of convenience as well as mixtures thereof. Maltodextrins and polydextrose are amount the suitable nonsweet bulking agents that can be used.

The optional sweetener and/or non-sweet saccharide bulking agents or combinations will be present in an amount form about 0 to 40 percent by weight of the overall dry mix, preferably from about 5 percent to about 25 percent by weight.

The dry instant dessert mix composition is mixed with a cold aqueous medium, preferably milk or water, at a temperature of less than about 20° C., preferably less than about 10° C., most preferably less than about 5° C. to hydrate the starch and form the desired prepared dessert product that is ready to eat. In general, it is preferred that from about 20 g. to about 80 g., preferably from about 25 g. to about 50 g., of dry instant dessert mix be hydrated with 480 g. (2 cups) of aqueous medium. Traditional dry instant dessert mixes require approximately 100 g. of dry instant mix per 480 g. of aqueous liquid.

In terms of the prepared hydrated mix itself (including aqueous ingredients), the sugar and/or non-starch saccharide bulking agents will be present in an amount of from about 0.05 percent to about 2.5 percent of the hydrated mix.

The ratio of the cold water swelling hydroxypropylated granular starch component to sweetener/non-sweet saccharide bulking agent component in the dry mix will be in the range of about 5:1 to 2:1, preferably 3:1 to 2:1.

The high intensity sweetener used in the composition of the invention includes aspartame, cyclamates, saccharin, acesulfame K and the like. The type of high intensity sweetener used is not critical. Generally, the amount of high intensity sweetener used is less than 4 percent of the weight of dry dessert composition, although the specific amount depends upon the type of high intensity sweetener. In the use of aspartame, it is preferred that it be included at less than 2% of the weight of the dry mix.

The use of the cold water swelling hydroxypropylated granular starch allows for reduction in amount of non-starch saccharide bulking and/or sweetener agents used in compositions sweetened with high intensity sweetener. When the dessert compositions are prepared using previously described ratios of cold water swelling hydroxypropylated starch to non-starch saccharide bulking and/or sweetener component, the per serving calorie content of the hydrated dessert product reduced from the level found in similar desserts based on traditional formulations or recipes. A one half cup serving of the dessert of the invention prepared with low fat (2% milk) would, for example, contain approximately 100 calories as compared to 160 calories per serving of a traditional commercial instant pudding. It is preferred that a serving of the dessert mix of this invention, when hydrated, contain at least 20% fewer calories, and preferably, 33% fewer calories than a serving of the traditional dessert item that does not contain a high intensity sweetener.

Other ingredients which may be used in the composition of this invention include various phosphate setting salts, colors, flavors, acidulants and other ingredients necessary to aid in setting milk proteins, and/or provide the desired color and flavor.

Having thus described the various embodiments of the present invention, the following examples are provided to more fully illustrate those embodiments, however, without limiting the invention to specfic details of the examples.

EXAMPLE 1

Propylene oxide (206 g.) was added to a slurry of 1510 g. unmodified waxy maize starch (1370 g., dry solids, basis, dsb) in 4374 g. of 3A ethanol with 22 g. sodium hydroxide in 301 g. of water. The reaction mixture contained a total of 441 g. water. The slurry was mixed in a jacketed batch reactor which was heated by adding steam to the reactor jacket until the slurry reached a temperature of 160° C. The reaction was allowed to proceed for 20 minutes at 160° C. After completion of the reaction, the slurry was cooled to 65° C. and neutralized by adding 60 ml. glacial acetic acid to reduce the pH of the slurry to 4.5–5.0. The slurry was then cooled to less than 25° C.

The slurry was centrifuged and the starch cake was then washed with 3A ethanol and then dried.

The resulting starch contained 7.2 percent hydroxypropyl groups. The starch had an initial viscosity of 55 cps and a 5 minute viscosity of 6,550 cps as measured by the Hydration Rate test. The starch paste had a smooth uniform consistency and was free from lumps and "fish eyes".

A reduced calorie instant Vanilla Pudding mix was prepared by mixing together the following ingredients:

| Ingredient | grams | Percent |
| --- | --- | --- |
| Starch as prepared above | 18.3 | 61.0 |
| Baker's Special Sugar | 7.2 | 24.0 |
| Tetrasodium pyrophosphate | 1.2 | 4.0 |
| Disodium Phosphate | 1.2 | 4.0 |
| Emulsifier[1] | 0.3 | 1.0 |
| Hydrogenated Vegetable Oil | 0.6 | 2.0 |
| Salt | 0.3 | 1.0 |
| Aspartame[2] | 0.3 | 1.0 |
| Vanilla Flavor | 0.6 | 2.0 |
| Baker's Egg Shade Color | As desired | — |
| | 30 g | 100.0 |

[1]Durem 114 - Durkee Foods
[2]Aspartame - G. D. Searle and Company

The instant pudding mix was hydrated by adding it to 2 cups (480 ml) of cold low fat (2%) milk in a mixing bowl and mixing with an electric mixer at medium to slow speed. The mixture was mixed until smooth (about 2–3 minutes). The mix easily dispersed into the cold milk, had a texture equivalent to a cook-up pudding and did not have syneresis.

One half cup serving of this pudding contains approximately 100 calories as compared to 160 calories per serving of Jell-O ™ Instant Pudding prepared with low fat (2%) milk.

EXAMPLE 2

Propylene oxide (331.8 g.) was mixed into a slurry of 2020.5 g. at 13.2 moisture unmodified corn starch (1754 g., dry solids basis, dsb) in 3932.5 g. of 3A ethanol containing 69.17 g. sodium hydroxide as a 50% aqueous solution and 146.3 g. water. The slurry was mixed in a batch reactor which was heated by adding steam to the reactor jacket until the slurry reached a temperature of 121° C. The reaction was allowed to proceed for 2 hours at 121° C. After completion of the reaction, the slurry was cooled to 65° C. and neutralized by adding 90.8 ml glacial acetic acid to reduce the pH of the slurry to 4.5–5.0. The slurry was then cooled to less than 25° C.

The slurry was centrifuged and the starch cake then was washed with 3A ethanol and then dried.

The resulting starch contained 13.5 percent hydroxypropyl. The starch had an initial viscosity of 184 cps and a 5 minute viscosity of 11,250 cps as measured by the Hydration Rate test. The starch slurry had a smooth texture and was free from lumps and "fish eyes".

The resulting starch is used to prepare an instant pudding mix composition as described in Example 1. The instant pudding mix is hydrated in cold milk without the formation of lumps.

EXAMPLE 3

A reduced calorie instant Vanilla pudding mix was used as a model to illustrate the benefits of using a cold water swelling hydroxypropylated starch in accordance with the present invention. A base mix was prepared using the following ingredients.

| Ingredient | Percent |
| --- | --- |
| Maltodextrin (5 D.E.) | 60.6 |
| Tetrasodium pyrophosphate | 10.7 |
| Disodium phosphate | 10.7 |
| Hydrogenated Vegetable Oil[1] | 4.8 |
| Vanilla Flavor | 4.1 |
| Emulsifier[2] | 3.3 |
| Salt | 3.3 |
| Aspartame | 2.5 |
| | 100.0 |

[1]Bealite BV, Beatrice Foods
[2]Durem 114, Durkee Foods

The dry mix was prepared by blending the Maltodextrin with hydrogenated vegetable oil and then adding melted emulsifier to the blend. The other dry ingredients were then blended into the base pudding mix.

Various starch materials were evaluated by adding 18.3 g. of test starch to 11.7 g. of base pudding mix. After mixing the starch into the base mix, the entire 30 g. was added to 2 cups (480 ml) of cold milk (5° C.) and mixed with a Sunbeam Mixmaster on medium to slow speed until smooth (about 2–3 minutes). Viscosity was measured by Brookfield Viscometer 5 minutes and 30 minutes after mixing.

Various starch products prepared as outlined previously were evaluated in the above pudding system. The results are shown in Table 1.

TABLE I

| Base Starch | % Hydroxy Propyl | Hydration Rate Test Viscosity (cps) | | Pudding Viscosity (cps) | | Texture* S/I |
| --- | --- | --- | --- | --- | --- | --- |
| | | Initial | 5 Min. | 5 Min. | 30 Min. | |
| Waxy Maize | 7.2 | 55 | 6,550 | 41,000 | 71,000 | 2/3 |
| Corn | 11.5 | 730 | 15,850 | 70,600 | 90,800 | 1/2 |
| Corn | 10.6 | 90 | 7,900 | 41,200 | 97,400 | 1/1 |

*Texture by visual observation. S = Surface, I = Interior, score usage of 1 to 4. Lower values are best. Values 3 and below are acceptable.

What is claimed is:

1. A dry instant mix composition which is capable of dispersing in a cold aqueous medium and hydrating without lumping to produce a smooth textured dessert and which comprises:
    (a) from about 50 to 95 percent of a cold water swelling hydroxypropylated granular starch component characterized by (1) a hydroxypropyl substitution level of from about 6 to about 15 percent and (2) a viscosity profile, as measured by the Hydration Rate test using 5.5 percent starch (dsb) in 10° C. water, of less than 1,500 centipoises initially and more than 5,000 centipoises after 5 minutes hydration;
    (b) from about 0 to about 40 percent of a non-starch saccharide bulking and/or sweetener agent component selected from the group of mono-, di-, oligo- and polysaccharides; and,
    (c) a high intensity sweetener in an amount sufficient to increase the sweetness of said dessert composition.

2. A mix composition of claim 1 wherein the ratio of the amount of said starch component of the amount of said non-starch saccharide bulking and/or sweetener agent component is within the range of from about 5:1 to about 2:1.

3. A mix composition of claim 2 wherein the ratio of the amount of said starch component to the amount of said non-starch saccharide bulking and/or sweetener agent component is within the range of from about 3:1 to about 2:1.

4. A mix composition of claim 1, wherein the level of hydroxypropyl substitution of said starch component is from about 7 to about 14 percent.

5. A mix composition of claim 1, wherein the amount of said starch component is from about 60 to about 85 percent of said mix.

6. A mix composition of claim 1, wherein the amount of said non-starch saccharide bulking and/or sweetener agent is from 5 to about 25 percent of said mix.

* * * * *

UNITED STATES PATENT AND TRADEMARK OFFICE
CERTIFICATE OF CORRECTION

PATENT NO. : 4,623,549

DATED : November 18, 1986

INVENTOR(S) : Judy L. Katt et al

It is certified that error appears in the above–identified patent and that said Letters Patent are hereby corrected as shown below:

```
Column 1, line 68, for "predicted" read ---predicated---
Column 3, line 47, for "liquid" read ---liquids---
Column 4, line 47, for "out at a" read ---out as a---
Column 5, line 40, for "solution" read ---solution,---
Column 5, line 41, for "process in" read ---process is---
Column 5, line 64, for "agent in" read ---agent is---
Column 5, line 68, for "from 7" read ---from about 7---
Column 11, line 14, for "instant mix" read ---instant dessert mix---
```

Signed and Sealed this

Seventeenth Day of November, 1987

Attest:

DONALD J. QUIGG

Attesting Officer

Commissioner of Patents and Trademarks